United States Patent [19]
Tanigawa

[11] Patent Number: 5,999,608
[45] Date of Patent: Dec. 7, 1999

[54] TELEPHONE EXCHANGE APPARATUS HAVING AN INTEGRATED SERVICES DIGITAL NETWORK INTERFACE

[75] Inventor: Yoshihiro Tanigawa, Kawasaki, Japan

[73] Assignee: Canon Kabushiki Kaisha, Tokyo, Japan

[21] Appl. No.: 08/014,637

[22] Filed: Feb. 8, 1993

[30] Foreign Application Priority Data

Feb. 14, 1992 [JP] Japan .................................. 4-028234

[51] Int. Cl.[6] ............................ H04M 3/42; H04M 7/00; H04J 3/12
[52] U.S. Cl. ...................... 379/201; 370/522; 370/524; 379/208; 379/230; 379/234; 379/241
[58] Field of Search .................................... 379/201, 210, 379/212, 214, 233, 234, 94, 156, 157, 241, 208, 230; 370/58.1, 58.2, 58.3, 60.1, 94.1, 110.1, 522, 524

[56] References Cited

U.S. PATENT DOCUMENTS

| 4,741,026 | 4/1988 | Baxter et al. ........................ 379/158 X |
| 5,001,709 | 3/1991 | Satoh ....................................... 370/524 |
| 5,119,415 | 6/1992 | Aoyama ............................... 379/230 X |
| 5,276,687 | 1/1994 | Miyamoto ............................... 370/420 |
| 5,381,468 | 1/1995 | Ozawa ................................ 379/396 X |
| 5,475,744 | 12/1995 | Ikeda ................................... 379/234 X |

*Primary Examiner*—Harry S. Hong
*Attorney, Agent, or Firm*—Morgan & Finnegan, L.L.P.

[57] ABSTRACT

A telephone exchange apparatus having a memory for storing the status information of extensions and outside lines. Upon reception of a predetermined setup message from an extension ISDN telephone, if there is a held line, the apparatus connects the line with the extension ISDN telephone which has transmitted the setup message. Thus an extension ISDN telephone can respond to a held call.

63 Claims, 12 Drawing Sheets

FIG. 11

| | |
|---|---|
| (a) | 0XXXXXXXX | OUTSIDE LINE AUTOMATIC CALLING |
| (b) | 90 | HELD EXTENSION RESPONSE |
| (c) | 9Y | HELD OUTSIDE LINE RESPONSE OUTSIDE LINE CALL-PICKUP |
| (d) | 9YXXXXXXXX | OUTSIDE LINE CALLING |
| (e) | ZXX | EXTENSION CALLING |
| (f) | 9* | EXTENSION CALL-PICKUP |

TELEPHONE EXCHANGE APPARATUS HAVING AN INTEGRATED SERVICES DIGITAL NETWORK INTERFACE

BACKGROUND OF THE INVENTION

The present invention relates to a telephone exchange apparatus, and more particularly, to a telephone exchange apparatus having an ISDN (Integrated Services Digital Network) interface.

Generally, exclusive telephones dedicated to a system comprise a display unit for displaying an outline connecting status, however, telephone used as an extension ISDN terminal does not have such display unit.

For this reason, when a speaker at a dedicated exclusive telephone wishes to transfer a call from an outside line or an extension to an extension ISDN terminal, the speaker holds the call and inputs an extension number of the terminal so that the call is transferred to the terminal.

Accordingly, even if the terminal is near the transferring extension, the speaker of the extension should hold the call and inputs the extension number of the terminal.

Further, in case of an incoming call from an outside line, only the telephones which have been designated to ring at incoming calls by setting a PBX (Private Branch Exchange) in advance can respond to the incoming call.

In this case, a problem is that a user at a terminal which is not set to response to incoming calls cannot answer the incoming call. If all the extension ISDN terminals are set to be responsive, they ring at the incoming call at once, annoying users.

Generally, in order to connect an extension ISDN terminal to an outside line, a number "0" is supplied to the PBX before a destination dialing number. Upon reception of "0" from the extension ISDN terminal, the PBX determines that the call is connected to an outside line and searches a plurality of connected outside lines for a non-busy outside line in a predetermined order (e.g., from outside line No. 1). Thereafter, the PBX supplies the dialing signal to the seized outside line.

If a plurality of outside lines of different networks are connected to the system, an undesired outside line might be selected or even an erroneous dialing signal might be generated, confusing the operation.

Further, extension ISDN terminals connected to a PBX having an extension ISDN interface do not have a call-pickup function for responding in place of a called extension. For this reason, if there is an extension call at one of the terminals from another terminal and nobody is at the called terminal, a person who has noticed the call has to go there to answer, which is troublesome to the users.

SUMMARY OF THE INVENTION

The present invention has been made in consideration of the above situation, and has as its object to provide a telephone exchange apparatus which allows ISDN terminals to respond to held extension or outside line calls.

In order to attain the above object, a telephone exchange apparatus according to the present invention having an extension ISDN interface, comprises: determination means for determining whether or not a predetermined setup message from an extension ISDN terminal connected to the interface is received; and connection means for connecting a held call with the extension ISDN terminal which has transmitted the setup message, if said determination means determines that the setup message is received.

Otherwise, a telephone exchange apparatus having an outside line interface for at least one outside line and an exclusive interface for a plurality of exclusive telephones, including at least one ISDN telephone, comprises: first determination means for determining whether or not a predetermined setup message from an extension ISDN telephone is received; second determination means for determining based on the contents of said memory means whether or not there is a held call; and connection means for, if said second determination means determines that there is a held call, connecting the call with the extension ISDN terminal which has transmitted the setup message.

Another object of the present invention is to provide a telephone exchange apparatus which allows ISDN terminals to respond to held outside line calls with simple operation at the ISDN terminals.

In order to attain the above object, a telephone exchange apparatus according to the present invention having an extension ISDN interface, comprises: first determination means for determining whether or not a predetermined setup message from an extension ISDN terminal connected to the interface is received; second determination means for determining whether or not there is a held outside line; and connection means for, if said first determination means determines that the setup message is received and said second determination means determines that there is a held outside line, connecting the extension ISDN terminal which has transmitted the setup message with the held outside line.

Further, another object of the present invention is to provide a telephone exchange apparatus which allows ISDN terminals to respond to held extension calls with simple operation at the ISDN terminals.

The above object can be attained by providing a telephone exchange apparatus having an extension ISDN interface, comprising: first determination means for determining whether or not a predetermined setup message from an extension ISDN terminal connected to the interface is received; second determination means for determining whether or not there is a held call; and connection means for, if said first determination means determines that the setup message is received and said second determination means determines that there is a held extension, connecting the extension ISDN terminal which has transmitted the setup message with the held extension.

Another object of the present invention is to provide a telephone exchange apparatus which allows ISDN terminals to respond to incoming calls from outside lines or extensions with simple operation at the ISDN terminals.

The above object can be attained by providing a telephone exchange apparatus having an extension ISDN interface, comprising: determination means for determining whether or not a predetermined setup message from an extension ISDN terminal connected to the interface is received; and connection means for connecting a calling side with the extension ISDN terminal which has transmitted the setup message.

Otherwise, a telephone exchange apparatus having an interface for at least one outside line and an interface for a plurality of exclusive telephones, including at least one ISDN telephone, comprises: first determination means for determining whether or not a predetermined setup message from an extension ISDN telephone is received; second determination means for determining whether or not there is a called extension; and connection means for, if said second determination means determines that there is a called extension, connecting a calling side and the extension ISDN terminal which has transmitted the setup message.

Further, another object of the present invention is to provide a telephone exchange apparatus which allows ISDN terminals to respond to incoming calls from outside lines with simple operation at the ISDN terminals.

In order to attain the above object, a telephone exchange apparatus having an extension ISDN interface, comprises: first determination means for determining whether or not a predetermined setup message from an extension ISDN terminal connected to the interface is received; second determination means for determining whether or not there is an incoming call from an outside line; and connection means for, if said first determination means determines that the setup message is received and said second determination means determines that there is an incoming call from an outside line, connecting the extension ISDN terminal which has transmitted the setup message with the outside line.

Another object of the present invention is to provide a telephone exchange apparatus which allows ISDN terminals to respond to incoming calls from extensions with simple operations at the ISDN terminals.

In order to attain the above object, a telephone exchange apparatus having an extension ISDN interface, comprises: first determination means for determining whether or not a predetermined setup message from an extension ISDN terminal connected to the interface is received; second determination means for determining whether or not there is an incoming call from an extension; and connection means for, if said first determination means determines that the setup message is received and said second determination means determines that there is an incoming call from the extension, connecting the extension ISDN terminal which has transmitted the setup message with the calling extension.

Another object of the present invention is to provide a telephone exchange apparatus which allows ISDN terminals to select desired outside lines and make outgoing calls.

The above object can be attained by providing a telephone exchange apparatus having an extension ISDN interface, comprising: determination means for determining whether or not a predetermined setup message including c called party number from an extension ISDN terminal connected to the interface is received; and seizing means for, if said determination means determines that the setup message is received, seizing an outside line based on the called party number included in the setup message.

Otherwise, a telephone exchange apparatus having an extension ISDN interface, comprises: determination means for determining whether or not a setup message in a predetermined format including a called party number from an extension ISDN terminal connected to the interface is received; selection means for, if said determination means determines that the setup message is received, selecting an outside line based on the called party number included in the setup message; and calling means for calling based on a dialing information from the extension ISDN terminal via the outside line selected by said selection means.

Further, another object of the present invention is to provide a telephone exchange terminal which connects ISDN terminals to desired outside lines with simple operation at the ISDN terminals and which allows the terminals to make outgoing calls, response to incoming calls and call-pickups.

The above object can be attained by providing a telephone exchange apparatus having an interface to be connected to a plurality of different kinds of outside lines and an interface to be connected to a plurality of extensions including at least one extension ISDN telephone, comprising: memory means for storing status information of outside line and extensions connected to the interfaces; reception means for receiving a setup message in a predetermined format including a called party number from an extension ISDN telephone; detection means for detecting the status of a specified outside line specified by the called party number based on the status information stored by said memory means; calling means for, if said detection means detects that the status of the specified outside line is non-busy status, connecting the extension ISDN terminal which has transmitted the setup message with the specified outside line and make an outside line calling; and connection means for, if said detection means detects that the status of the specified outside line is held status or called status, setting the status of the outside line to busy status and connecting the extension ISDN telephone which has transmitted the setup message with the outside line.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a diagram showing the format of a setup message; and

DETAILED DESCRIPTION OF THE PREFERRED EMBODIMENTS

Preferred embodiments of the present invention will be described in detail in accordance with the accompanying drawings.

Figure 1:
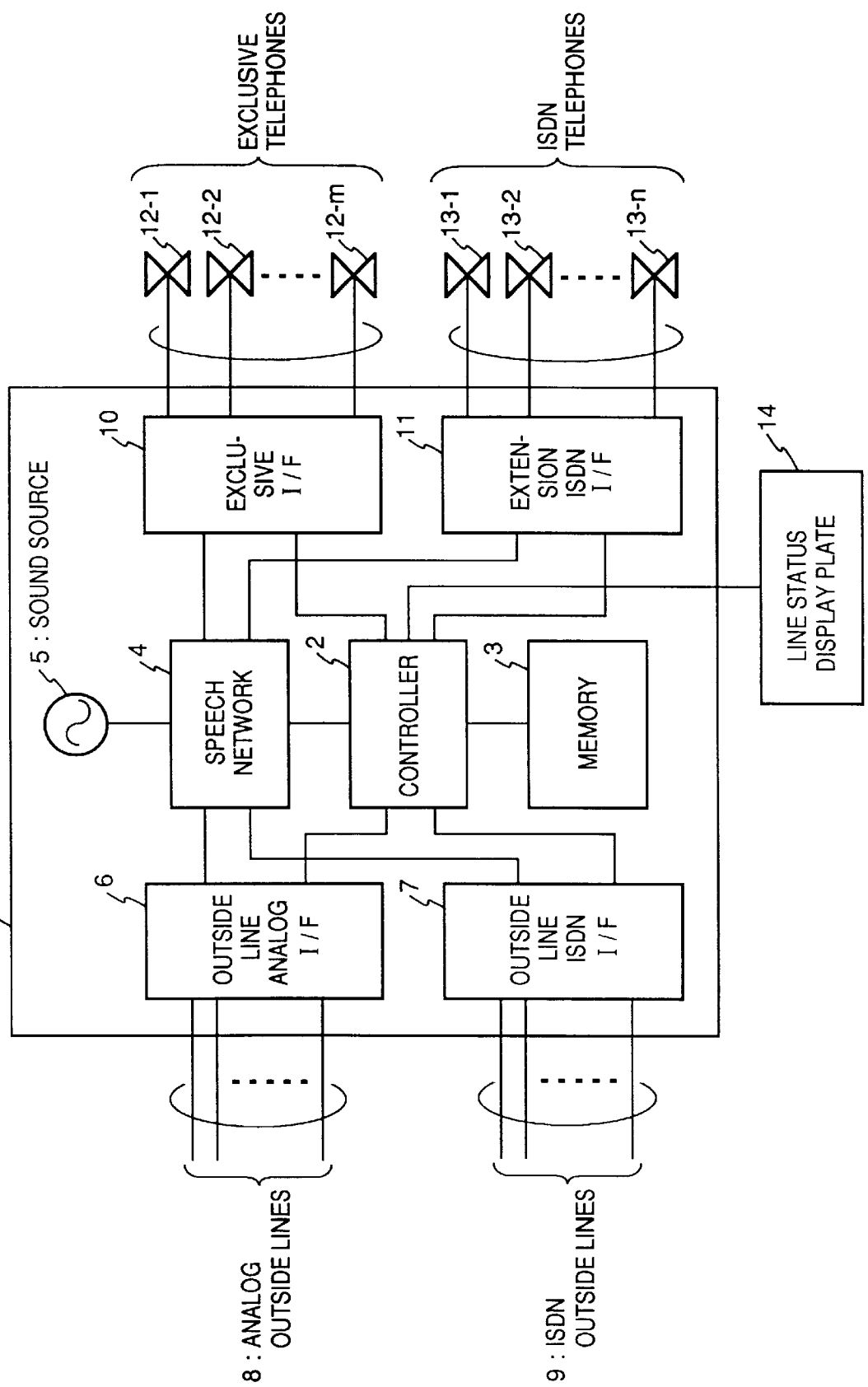
FIG. 1 is a block diagram showing the configuration of a telephone exchange apparatus according to an embodiment of the present invention.

FIG. 1 shows the configuration of a telephone exchange apparatus according to an embodiment of the present invention. In FIG. 1, reference numeral 1 denotes a main apparatus for controlling the overall key telephone apparatus (including exclusive telephones dedicated to the system and extension ISDN terminals); 2, a controller for controlling the main apparatus 1; 3, a memory for storing statuses of outside lines and extensions; 4, a speech network for connecting a communication path between an outside line and an extension or between an extension and outside line; 5, a sound source such as a holding tone; 6, an outside line analog interface for seizing an outside line and detecting dialing transmission and an incoming signal; 7, an outside line ISDN interface for executing protocol between the ISDN outside lines; 8, analog outside lines; 9, ISDN outside lines; 10, an exclusive interface for controlling detection of key pressings at the exclusives and transmission of incoming call tones; 11, an extension ISDN interface for executing protocol between the ISDN terminals; 12-1 to 12-m, exclusive telephones dedicated to the system; and 13-1 to 13-n, extension ISDN telephones. A line status display plate 14 displays connecting statuses of the outside lines and extension lines, and the controller 2 displays statuses of the outside lines and extensions stored in the memory 3.

Figure 12:
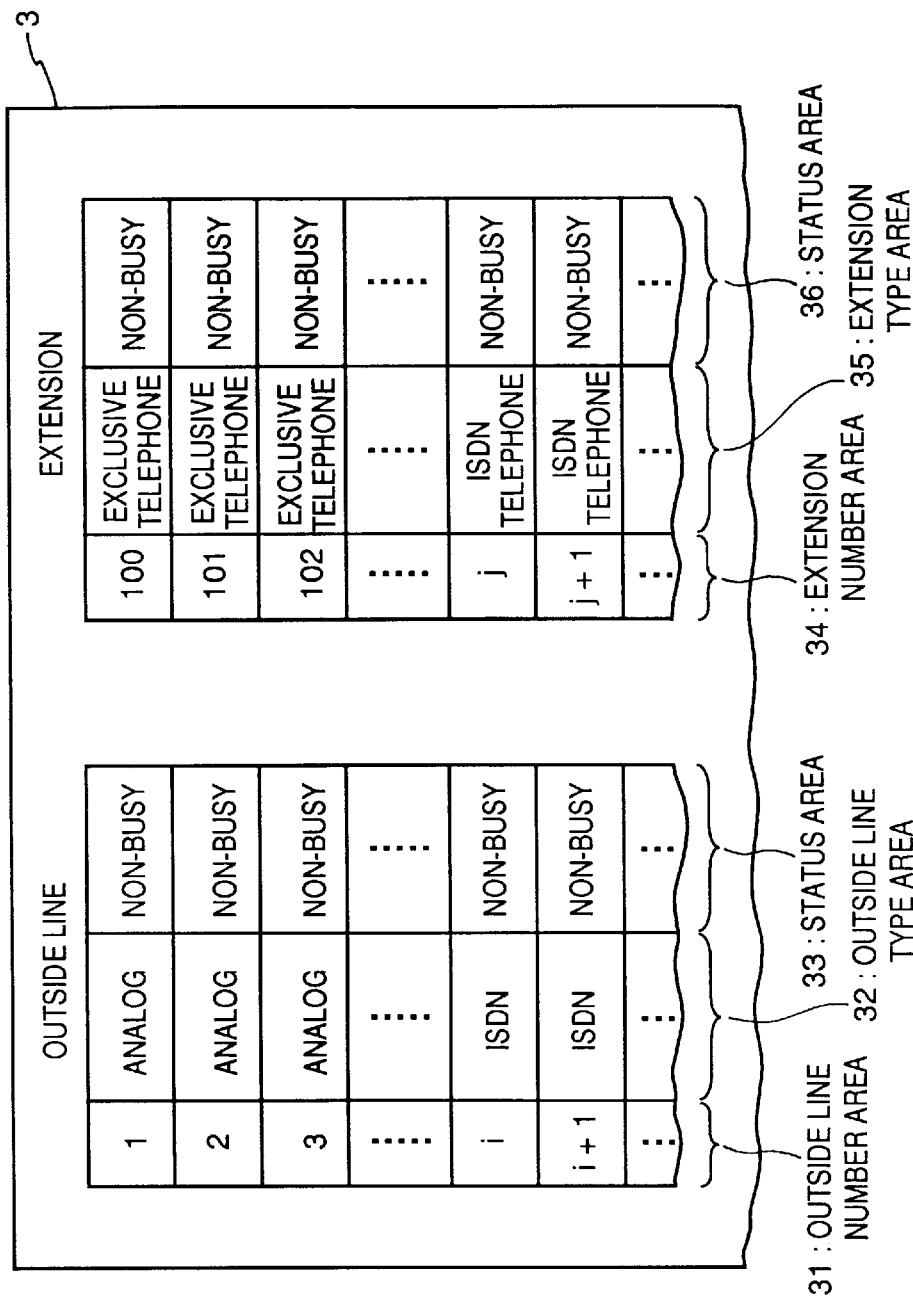
FIG. 12 is a diagram showing the contents of a memory.

FIG. 12 illustrates the contents of the memory 3 in the embodiment.

As shown in FIG. 12, the statuses of the outside lines and extensions are respectively managed in tables.

The outside line table has as its items an outside line number area 31, an outside line type area 32 for information to indicate whether the outside line is an analog line or an ISDN line, and a status area 33 for maintaining the respective outside line statuses. The outline table shows that at least outside lines 1, 2 and 3 are connected to the outside line analog I/F 6 and at least outside line i and i+1 are connected to the outside line ISDN I/F 7, further, these outside lines are in a non-busy status.

The extension table has a structure similar to that of the outside line table, which comprises an extension number area 34, an extension type area 35 for information to indicate the types of the extensions (information to indicate which of the exclusive I/F 10 and the extension ISDN I/F 11 the extensions are connected) and status area 36 for the respective extension statuses. The extension table shows that at least telephones of extension numbers 100 to 102 are connected to the exclusive I/F 10, and at least two of the telephones connected to extension numbers j and j+1 are ISDN telephones connected to the external ISDN I/F 11.

The controller 2 controls the line status display plate 14 so that the statuses in the status areas 33 and 36 can be discriminated by users.

Though it is not shown, the memory 3 also includes information to specify an exclusive telephone which rings upon reception of an incoming call from an outside line. The controller 2 controls these telephones to ring in case of an incoming call.

The operations of the apparatus 1 having the above construction will be described with reference to FIG. 2 which is a flowchart showing the operation of the controller 2. It should be noted that the controller 2 includes a CPU (not shown), a ROM (not shown), in which the operating procedures of the CPU (programs in FIG. 2 to be described later), and a RAM used as a work area for the CPU (not shown). The CPU updates the status areas 33 and 36 in the memory 3 in case where an incoming call from an outside line is received or line connection of the exclusives 12-1 to 12-m with other extensions or with the outside lines is performed.

Accordingly, in FIG. 2, only the process instructed from one of the extension ISDN telephones 13-1 to 13-n will be described below.

In step S201, the reception of a setup message from one of the extension ISDN telephones 13-1 to 13-n is monitored via the extension ISDN I/F 11. The setup message includes a calling party number and a called party number. On receiving the setup message, the process proceeds to step S202 in which whether the first digit of a called party number in the setup message is "0" or not is determined by the controller 2. If YES, the process advances to step S300 to perform an outside line automatic calling process.

If NO, whether the first digit is "9" or not is determined in step S203. If NO, the process advances to step S400 to perform an extension calling process.

If the first digit of the called party number in the setup message is "9", whether the second digit is "0" or not is determined in step S204.

If YES, the process advances to step S500 to perform a held extension response process.

If NO, whether the second digit is "*" or not is determined in step S208. If YES, the process advances to step S550 to perform an extension call-pickup process.

If the first digit of the called party number in the setup message from the extension ISDN telephone is "9" and the second digit is not "0" nor "*", the process proceeds to step S205 in which the second digit is treated as an outside line number. In FIG. 12, if the second digit is "1", the process for the corresponding outside line 1 (the analog line) is performed.

The process in step S205 and the subsequent steps is corresponding to the status of the specified outside line.

As described above, the updatings of the status areas 33 and 36 are at another task. The line statuses are non-busy, called status, held status, busy status, etc.

In step S205, whether the specified outside line is being held or not is determined by examining the status area 33 of the memory 3. If it is determined that the outside line is being held, the process advances to step S600 to perform an outside line call-pickup process.

If the outside line is non-busy, the process proceeds from step S207 to step S800 to perform an outside line calling process.

In other cases, e.g., the outside line is used by another telephone, the process advances to step S900 to reject reception of the communication from the extension ISDN telephone which generated the setup message.

Next, steps S300 to S900 will be described below.

Figure 2:
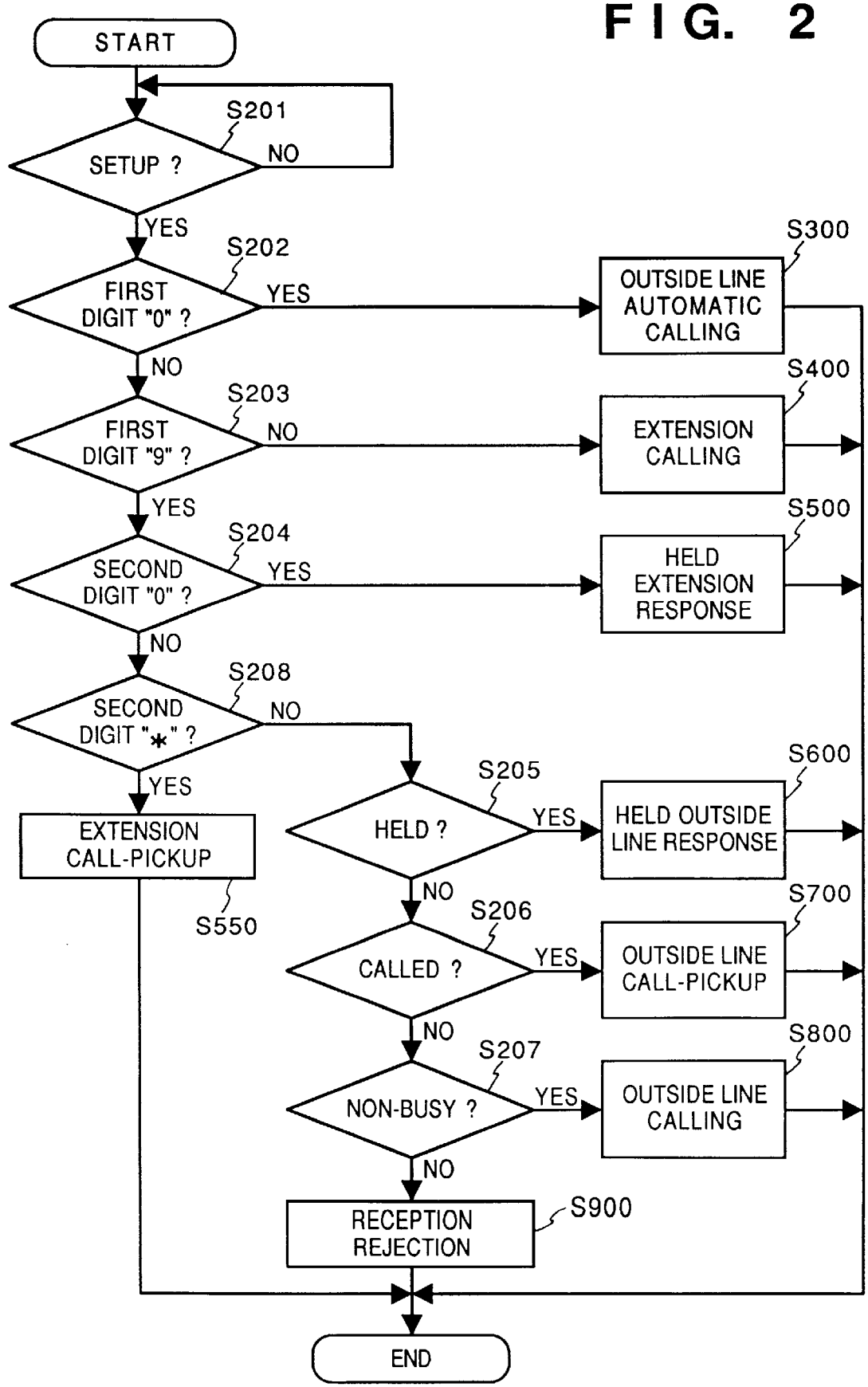
FIG. 2 is a flowchart showing a process by a controller of the telephone apparatus according to the embodiment.
Figure 3:
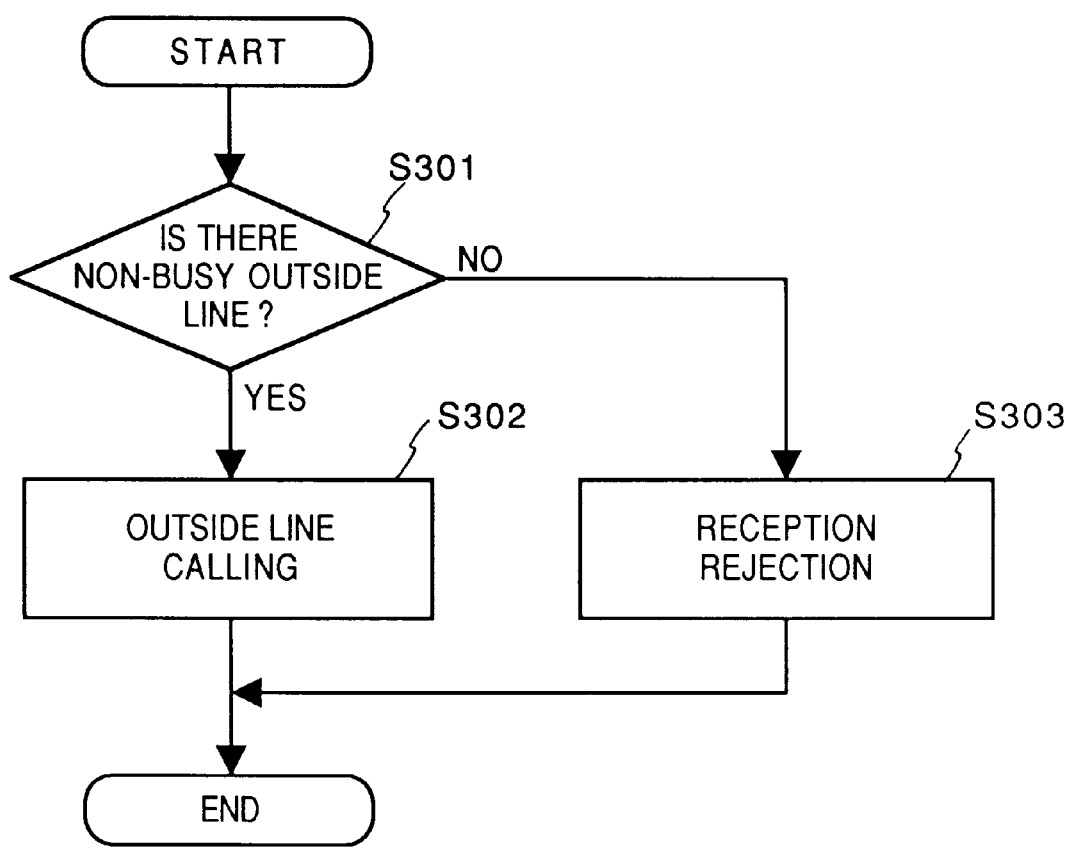
FIG. 3 is a flowchart showing an outside line automatic calling process.

FIG. 3 is a flowchart showing the operations of the outside line automatic calling process (S300 in FIG. 2).

If the first digit of the called party number in the setup message from the extension ISDN telephone is "0", whether there is non-busy outside line is determined by examining the status area 33 of the memory 3 in step S301. If YES, the outside line calling process via the outside line is performed in step S302. If NO, i.e., it is determined that all the outside lines are in communication, the reception rejection process is performed in step S303, more specifically, the outside line calling request from the extension ISDN telephone is cancelled.

Figure 4:
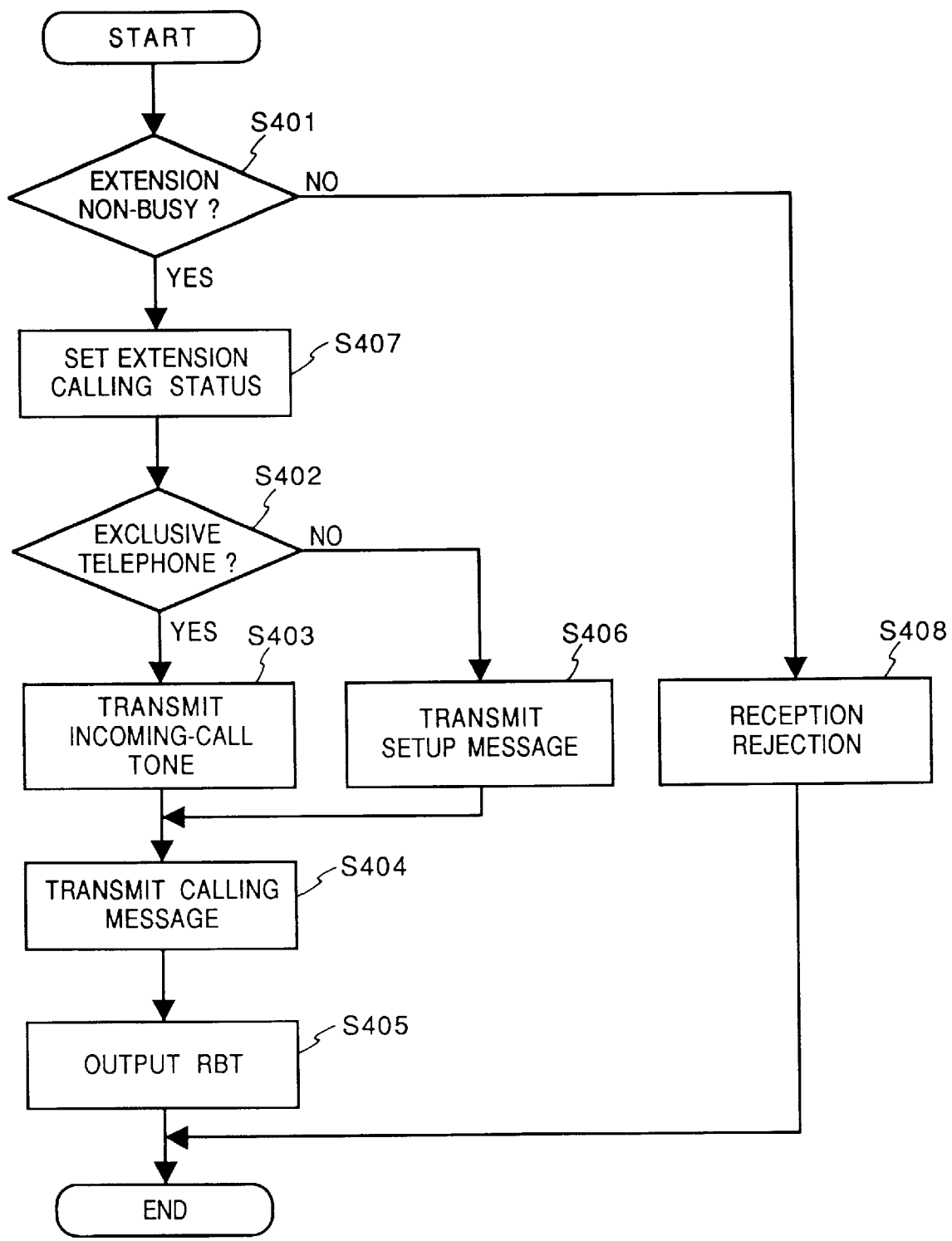
FIG. 4 is flowchart showing an extension calling process.

Next, the extension calling process in step S400 in FIG. 2 will be described with reference to FIG. 4.

In step S401, whether the extension indicated by a digit of the called party number in the input setup message is non-busy or not is determined by referring to the status area 36 of the memory 3.

If NO, i.e., the extension of the specified extension number is in communication, the reception of the communication is rejected in step S408.

If the extension is non-busy, the status of the area 36 corresponding to the extension ISDN telephone which has outputted the setup message is updated to the extension calling status in step S407. Next, the process proceeds to step S402 in which whether the extension is a dedicated exclusive telephone or an extension ISDN telephone is determined by examining the extension type area 35. If the receiving exclusive telephone is one of the exclusives 12-1 to 12-m, the process proceeds to step S403 in which an incoming-call tone is transmitted to the exclusive via the exclusive I/F 10 so that the exclusive will ring.

On the other hand, if the receiving telephone is an extension ISDN telephone, a setup message is transmitted to the extension ISDN telephone (called extension ISDN telephone) via the extension ISDN I/F 11 in step S406.

In step S404, a calling message is transmitted to the calling side extension ISDN telephone and the speech network 4 is controlled to supply a RBT (ring-back tone) to the calling extension ISDN telephone from the sound source 5 in step S405.

Figure 5:
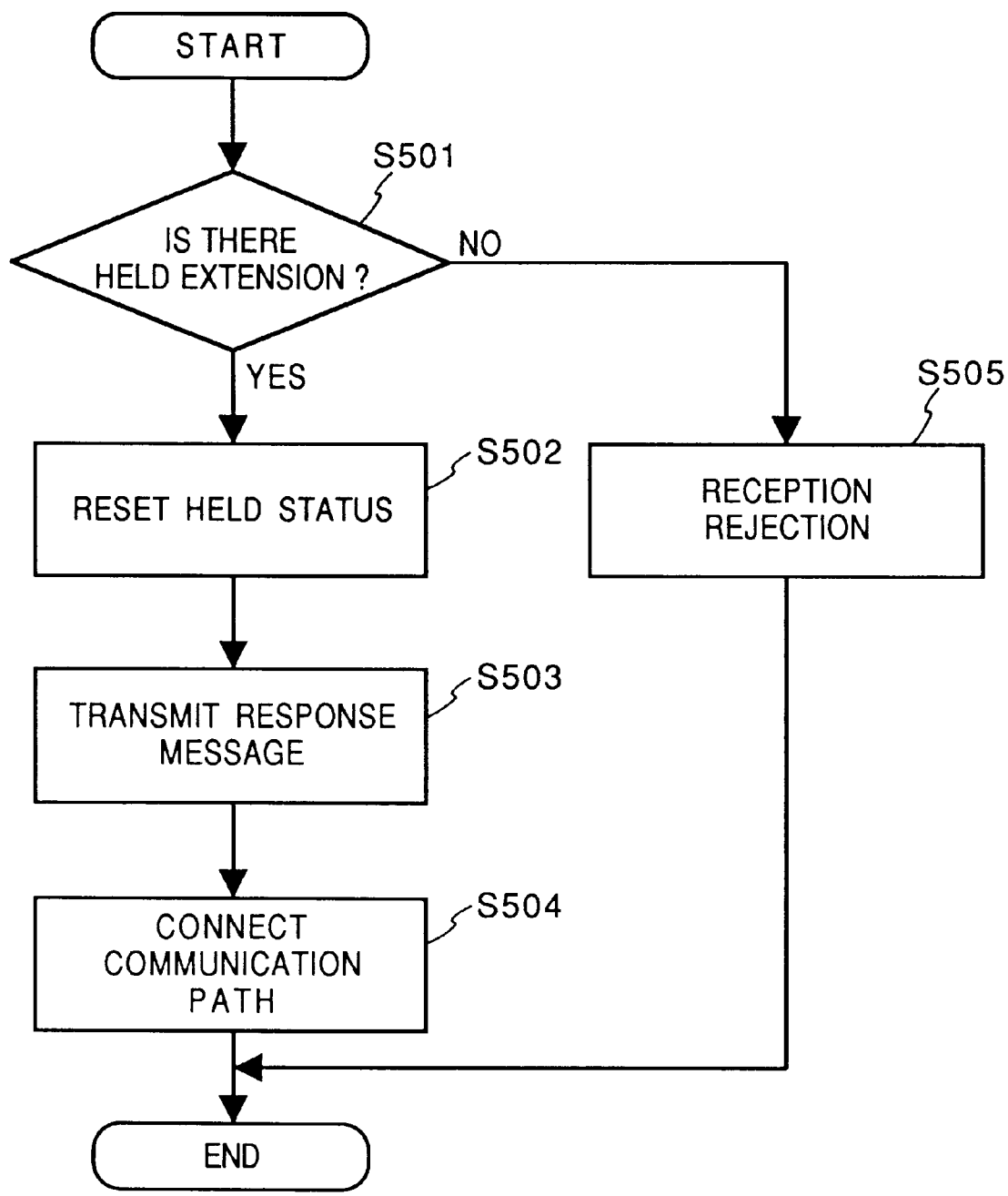
FIG. 5 is a flowchart showing a held extension response process.

Next, the held extension response process will be described with reference to a flowchart in FIG. 5. It should be noted that this process is performed in case where the first digit of the called party number in the setup message from the extension ISDN telephone is "9" and the second digit is "0".

First, whether there is a held extension is determined by referring to the status area 36 of the memory 3 in step S501. If NO, the reception of the held extension response instruction is rejected in step S505. If YES, the status area 36 of the held extension is reset in step S502, and a response message is transmitted to the extension ISDN telephone which is to respond to the held call via the extension ISDN I/F 11 in step S503.

In step S504, the speech network 4 is controlled to connect the communication path between the held extension terminal with the responding ISDN telephone.

Figure 6:
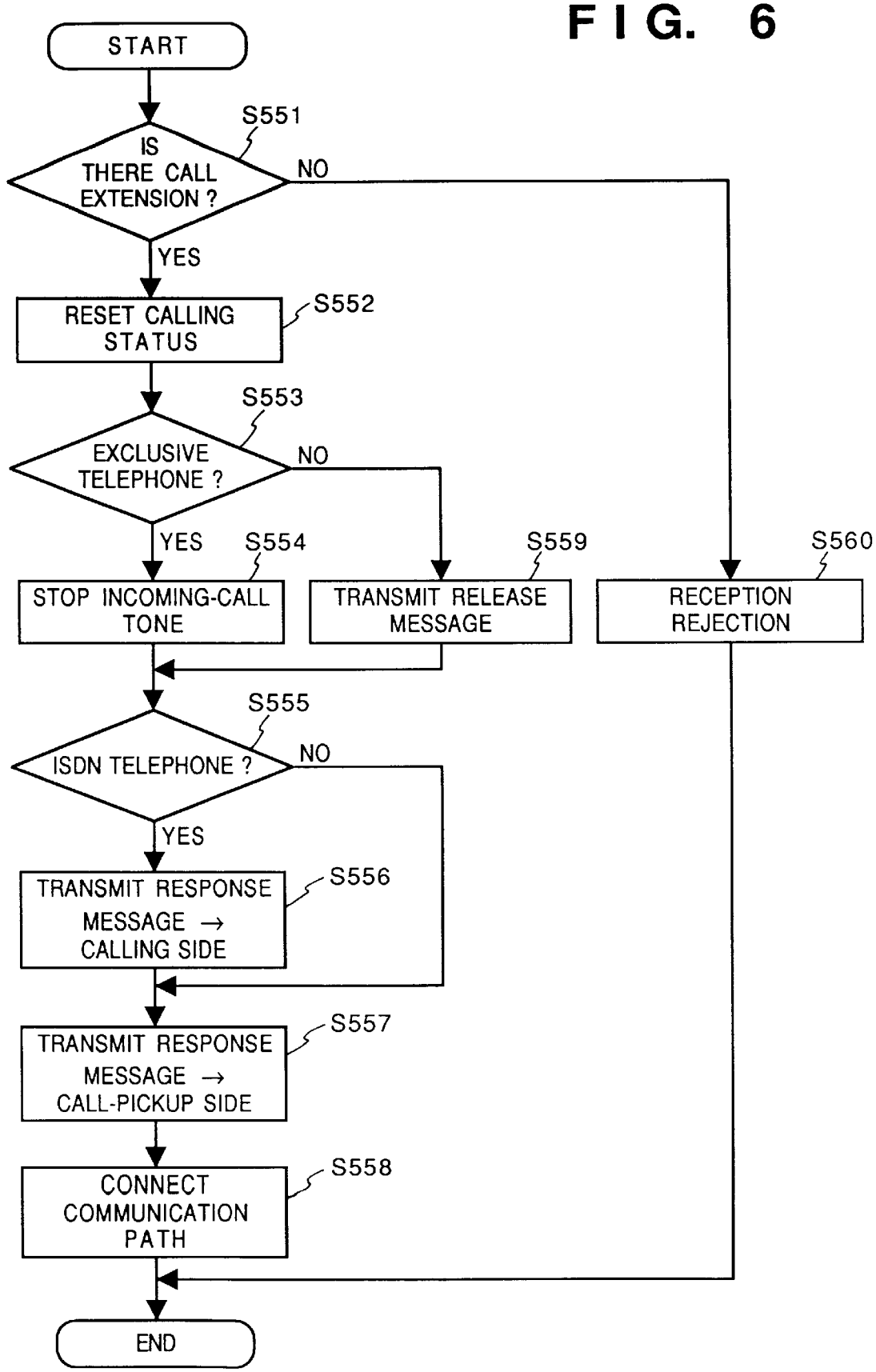
FIG. 6 is a flowchart showing an extension call-pickup process.

Next, the extension call-pickup process of step S550 in FIG. 2 will be described with reference to a flowchart in FIG. 6. This process is performed in case where the extension ISDN telephone outputs a setup message including a called party number in which the first digit is "9" and the second digit is "*".

In step S551, whether or not there is a telephone in the extension calling status (ring-back status) is determined by referring to the status area 36 of the memory 3 in step S551. If NO, the reception of the extension substitute response instruction is rejected in step S560, since it is meaningless in this case. If YES, the extension calling information in the memory 3 is reset in step S552, and whether the ringing extension telephone (called side telephone) is a dedicated exclusive telephone or not is determined in step S553.

If it is determined that the called side telephone is a dedicated exclusive telephone, the incoming-call tone at the telephone is stopped by controlling the exclusive I/F 10 in step S554.

On the other hand, if the called side telephone is an extension ISDN telephone, a release message is transmitted to the ISDN telephone in called status via the extension ISDN I/F 11 in step S559.

Next, in step S555, whether the calling side telephone is an ISDN telephone is determined. If YES, a response message is transmitted to the calling ISDN telephone 13 via the extension ISDN I/F 11 in step S556. In step S557, a response message is transmitted via the extension ISDN I/F 11 to the extension ISDN telephone which is to respond, and the speech network 4 is controlled to connect the communication path between the calling extension and the responding ISDN telephone.

Figure 7:
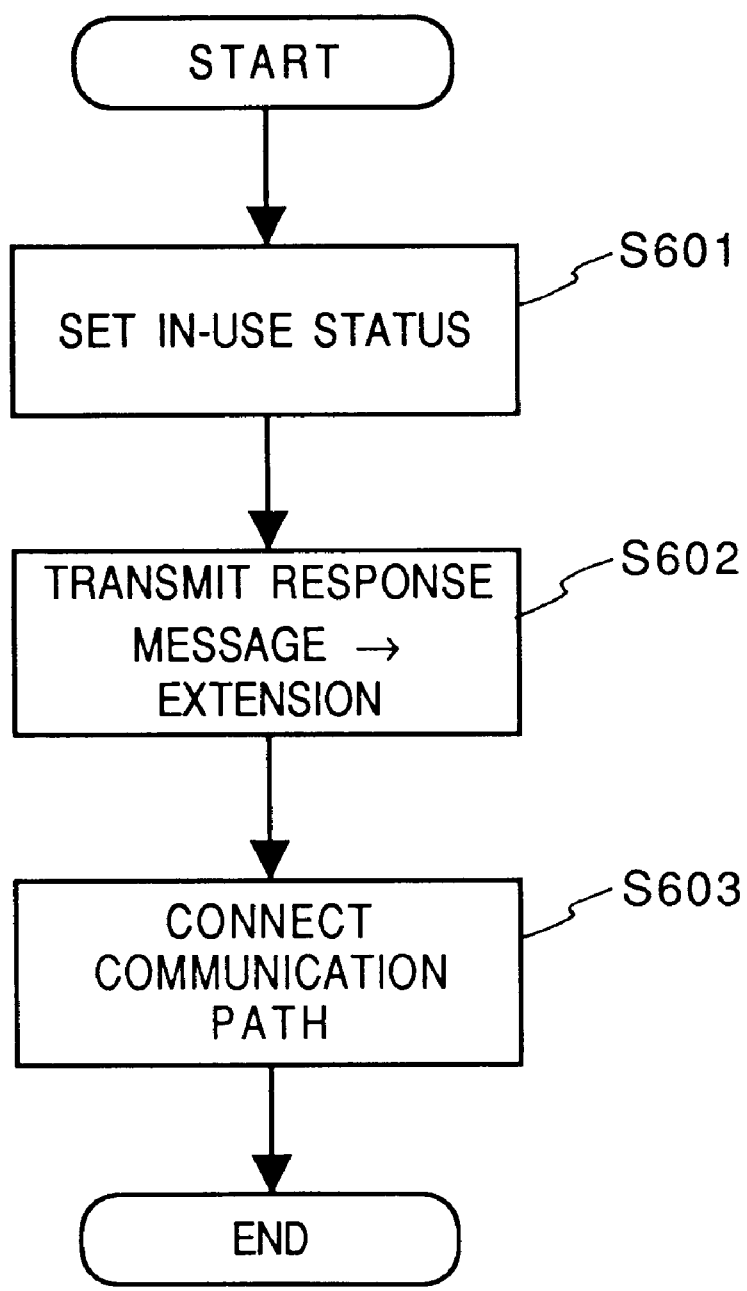
FIG. 7 is a flowchart showing a held outside line response process.

Next, the held outside line response process in step S600 in FIG. 2 will be described with reference to a flowchart in FIG. 7. This process is performed in case where the extension ISDN telephone transmits a setup message including a called party number in which the first digit is "9" and the second digit is a numeral indicating an outside line number (except "0" and "*") and the outside line is held.

In step S601, the status of the outside line specified with the second digit of the setup message from the responding extension ISDN telephone is set from the held status to a in-use status. In step S602, a response message is transmitted via the extension ISDN I/F 11 to the extension ISDN telephone which is to respond to the outside line incoming call, and the speech network 4 is controlled to connect the communication path between the specified outside line and the responding ISDN telephone.

Figure 8:
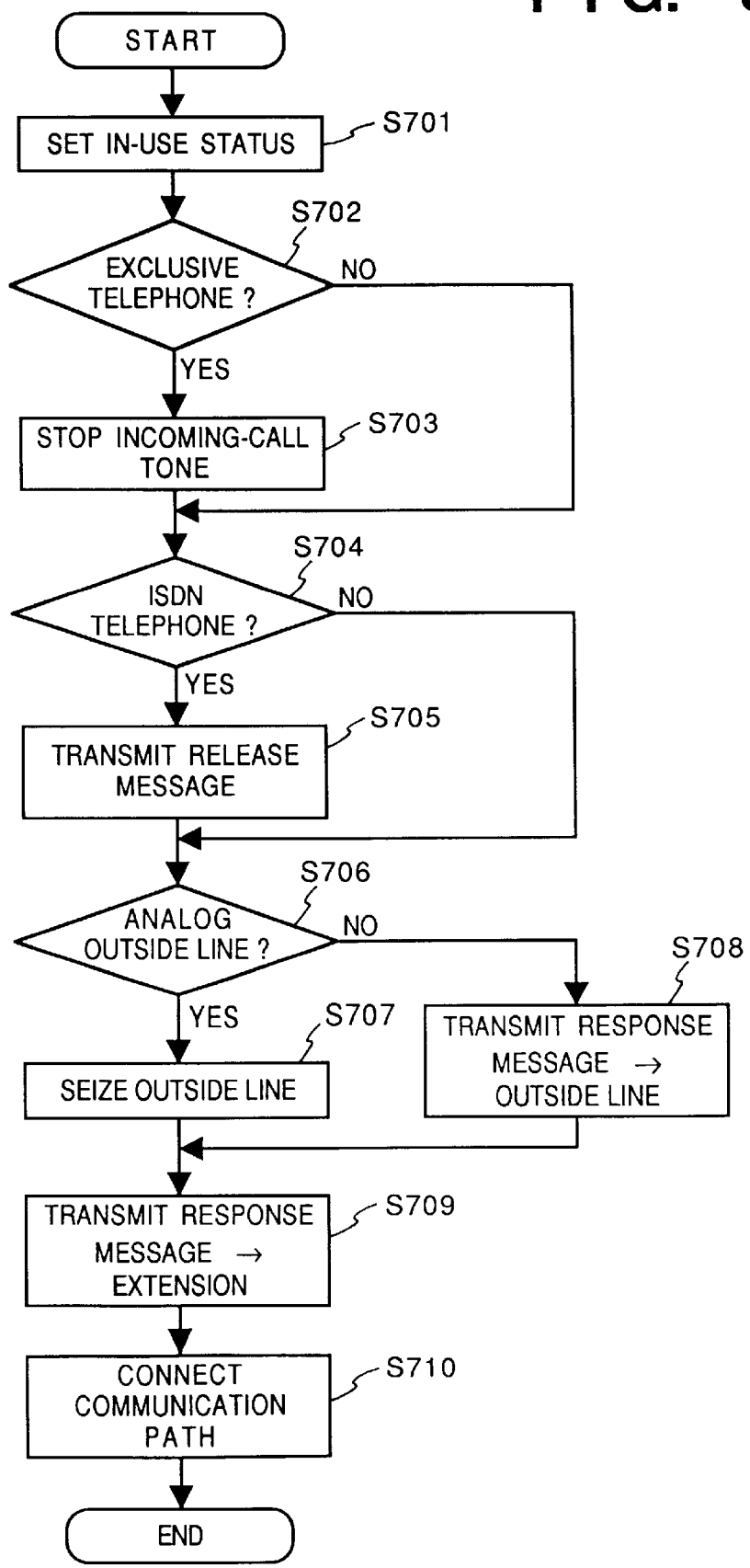
FIG. 8 is a flowchart showing an outside line call-pickup process.

Next, the outside line call-pickup process in step S700 in FIG. 2 will be described with reference to a flowchart in FIG. 8. This process is performed in case where the extension ISDN telephone which is to respond to the outside line incoming call transmits a setup message including a called party number in which the first digit is "9" and the second digit is a numeral indicating an outside line number, and the outside line is in called status.

The status in the memory 3 of the outside line specified by the second digit of the called party number in the message from the extension ISDN telephone is changed from the called status to in-use status in step S701. Next, whether the dedicated extension telephones are ringing at the incoming call from the specified outside line is determined by referring to the memory 3 in step S702. If YES, the exclusive I/F 10 is controlled to stop the incoming-call tones of the exclusive telephones in step S703.

Further, whether the extension ISDN telephones are in called status is determined in step S704. If YES, a release message is transmitted to the ringing extension ISDN telephones via the extension ISDN I/F 11 to quit the called statuses in step S705. As a result, all the rings of the telephones at the incoming call from the outside line can be stopped.

The process proceeds to step S706 in which whether the called outside line is an analog line or an ISDN line is determined by referring to the memory 3.

If it is an analog line, the outside line is seized by controlling the outside line analog I/F 6 in step S707.

On the other hand, if the called outside line is an ISDN line, a response message is transmitted to the outside line via the outside line ISDN I/F 7 in step S708.

In step S709, a response message is transmitted via the extension ISDN I/F 11 to the extension ISDN which is to respond, and in step S710, the speech network 4 is controlled to connect the communication path between the outside line and the responding extension ISDN telephone.

Figure 9:
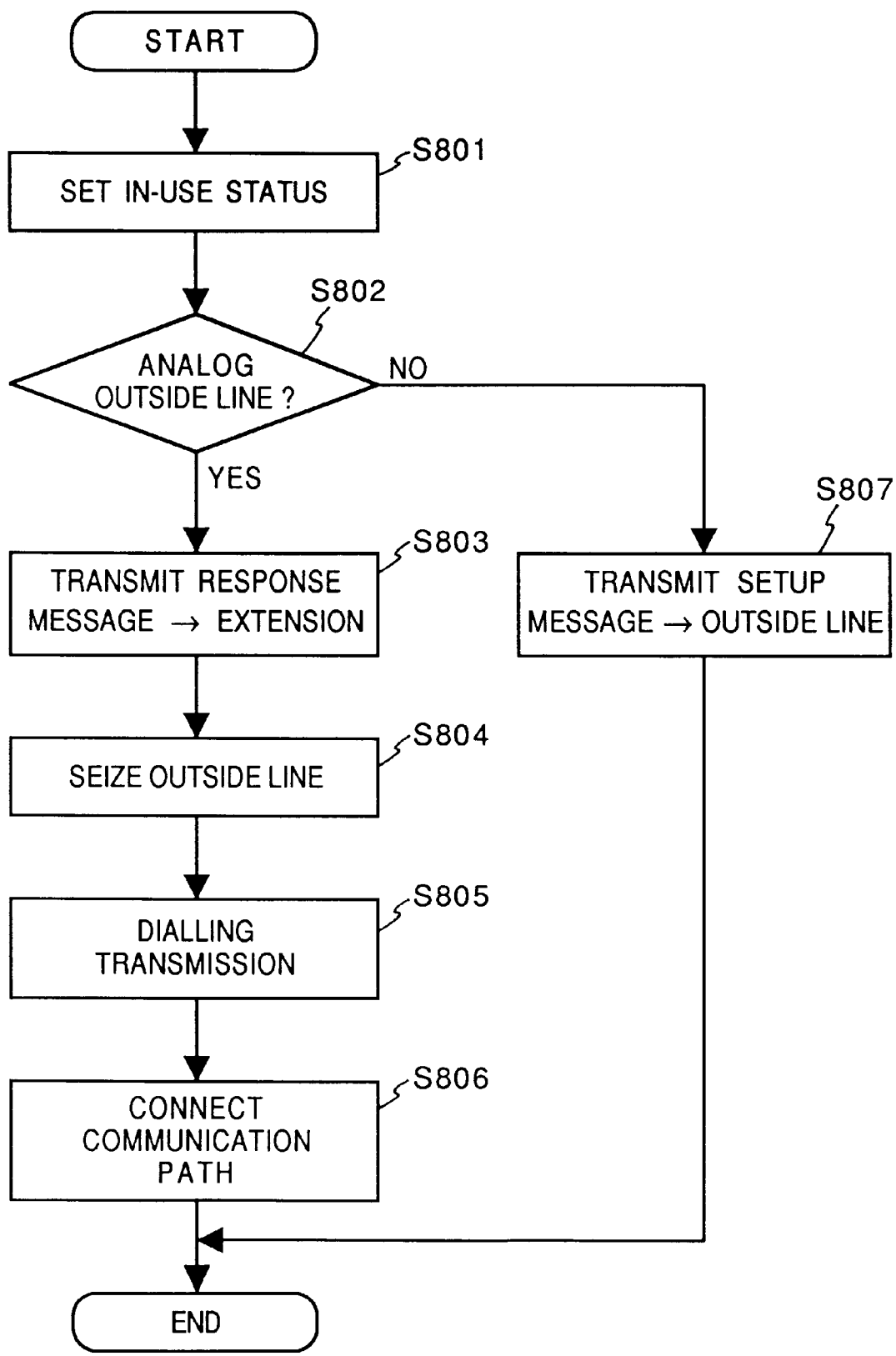
FIG. 9 is a flowchart showing an outside line calling process.

Next, the outside line calling process in step S800 in FIG. 2 will be described with reference to a flowchart in FIG. 9. This process is performed in case where an extension ISDN telephone transmits a setup message including a calling party number in which the first digit is "9" and the second digit is an outside line number and the outside line is non-busy.

In step S801, the status in the memory 3 indicated by the second digit of the calling party number in the message from the extension ISDN telephone which is to make an outside line call, is set from the non-busy status to in-use status. Next, whether the specified outside line is an analog line or an ISDN line is determined by referring to the memory 3 in step S802. If it is an analog line, a response message is transmitted via the extension ISDN I/F 11 to the ISDN telephone which is to make an outside line call in step S803. The outside line analog I/F 6 is controlled to seize the outside line in step S804, and dialing transmission to the outside line according to the third digit and the digits after the third digit of the called party number is performed in step S805. Thereafter, the speech network 4 is controlled to connect the communication path between the outside line and the calling ISDN telephone 13 in step S806.

If it is determined that the outside line is an ISDN line in step S802, the process proceeds to step S807 to transmit a setup message according to the third digit and the digits after the third digit of the called party number to the outside line via the outside line ISDN I/F 7.

Figure 10:
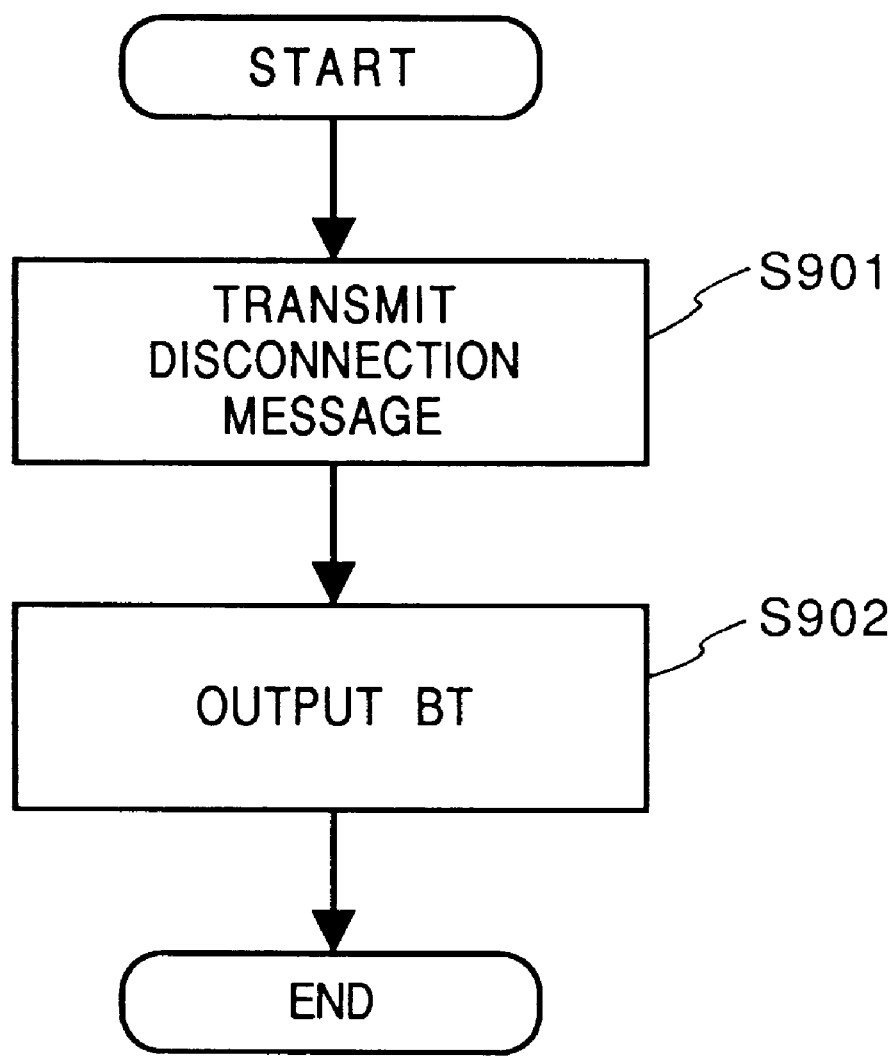
FIG. 10 is a flowchart showing reception rejection process.

Next, the reception rejection process in steps S900 in FIG. 2, S303 in FIG. 3, S408 in FIG. 4, S505 in FIG. 5 and S560 in FIG. 6 will be described with reference to a flowchart in FIG. 10.

In step S901, a disconnection message is transmitted to the extension ISDN telephone which has transmitted the setup message via the extension ISDN I/F 11. In step S902, the speech network 4 is controlled to supply a BT (busy tone) to the extension ISDN telephone from the sound source 5.

The format of the setup message from the above extension ISDN telephone is as shown in FIG. 11.

In FIG. 11, alphabet "X" denotes an arbitrary numeral; "Y", an arbitrary numeral within the number of the connected outside lines; and "Z", a numeral except "0" and "9".

The operations of the exchange apparatus of the present invention when it receives a setup message having the format as shown in FIG. 11 are as follows:

(a): The outside line automatic calling process is performed. At this time, a dialing signal except the first digit "0" is transmitted to the outside line.

(b): The held extension response process is performed.

(c): The outside line call-pickup process or the held outside line response process is performed. That is, the outside line call-pickup process is performed if an incoming call comes from the outside line indicated by "Y", and the held outside line response process is performed if the outside line indicated by "Y" is held.

(d): The outside line calling process is performed. A dialing signal except "9" and "Y" is transmitted to the outside line. Note it is necessary that the outside line indicated by "Y" is non-busy.

(e): The extension calling process is performed. The connecting process is performed to the extension telephone of the extension number indicated by "XX".

(f): The extension call-pickup process is performed.

In the above embodiment, the analog I/F and the ISDN I/F are provided on the outside line side, however, the apparatus can be constituted by either of the analog I/F or the ISDN I/F.

According to the present invention, the specific process is performed when the first digit of a setup message is "9". However, the present invention is not limited to this arrangement, i.e., any figure except "9" can be used. Further, the number of digits for specifying an outside line can be two or more.

As described above, the operation similar to the extension ISDN telephone calling operation enables an extension ISDN telephone to respond to a held outside line. In case where the held outside line is transferred to another extension ISDN telephone, oral response instead of annoying transfer operation, such as manual input of the number of the extension telephone, is possible.

As each extension ISDN terminal can select a desired outside line and make an outside line call, even in a case where different network outside lines are connected to the system, the outside line calling operation is not disturbed, thus the operativity can be improved.

According to the present invention, even an extension ISDN terminal not specified as the responding terminal to an outside line incoming call can respond to the call with a simple operation similar to the calling operation. For this reason, the number of the extension ISDN terminals set as incoming call receiving terminals (ring-back terminals) can be limited to the lowest number, improving the working condition.

According to the present invention, even an extension ISDN terminal can respond to an extension call with a simple operation similar to the calling operation. Accordingly, a person who notices that an extension telephone is ringing does not have to go there to respond, instead, the person can respond to the call with his extension ISDN telephone.

The present invention is not limited to the above embodiments and various changes and modifications can be made within the spirit and scope of the present invention. Therefore, to apprise the public of the scope of the present invention, the following claims are made.

What is claimed is:

1. A telephone exchange apparatus having an extension ISDN interface, comprising:

reception means for receiving a setup message including a called party number from an extension ISDN terminal connected to the interface;

determination means for determining whether or not an initial portion of the called party number has a predetermined value for responding to a held call; and connection means for connecting a held call with the extension ISDN terminal which has transmitted the setup message if said determination means determines that the initial portion of the called party number has the predetermined value for responding to a held call.

2. The apparatus according to claim 1, wherein the held call is originated from an outside line.

3. The apparatus according to claim 1, wherein the held call has held by an extension telephone.

4. A telephone exchange apparatus having an extension ISDN interface, comprising:

first determination means for determining whether or not a setup message from an extension ISDN terminal connected to the interface is received;

second determination means for determining whether or not an outside line specified by a called party number included in the setup message, is in a held state; and connection means for, if said first determination means determines that the setup message is received and said second determination means determines that the outside line specified by the called party number is in the held state, connecting the extension ISDN terminal which has transmitted the setup message with the specified outside line.

5. The apparatus according to claim 4, wherein said connection means includes:

send-back means for transmitting a response message to the extension ISDN terminal which has transmitted the setup message;

release means for releasing the held status of the outside line; and means for connecting a communication path between the outside line of which the held status has been released by said release means and the extension ISDN terminal to which said send-back means has transmitted the response message.

6. A telephone exchange apparatus having an extension ISDN interface, comprising:

reception means for receiving a setup message including a called party number from an extension ISDN terminal connected to the interface;

first determination means for determining whether or not there is a held extension;

second determination means for determining whether or not an initial portion of the called party number has a predetermined value for responding to the held extension; and connection means for, if said first determination means determines that there is a held extension and said second determination means determines that the initial portion of the called party number has the predetermined value for responding to a held extension, connecting the extension ISDN terminal which has transmitted the setup message with the held extension.

7. The apparatus according to claim 6, wherein said connection means includes:

send-back means for transmitting a response message to the extension ISDN terminal which has transmitted the setup message;

release means for releasing the held status of the extension; and means for connecting a communication path between the extension of which the held status has been released by said release means and the extension ISDN terminal to which said send-back means has transmitted the response message.

8. A telephone exchange apparatus having an extension ISDN interface, comprising:

reception means for receiving a setup message including a called party number from an extension ISDN terminal connected to the interface;

determination means for determining whether or not an initial portion of the called party number has a predetermined value for responding to an incoming call; and connection means for connecting a calling side with the extension ISDN terminal which has transmitted the setup message based on said determination means.

9. The apparatus according to claim 8, wherein the calling side is connected to an outside line.

10. The apparatus according to claim 8, wherein the calling side is an extension telephone.

11. A telephone exchange apparatus having an extension ISDN interface, comprising:

first determination means for determining whether or not a setup message from an extension ISDN terminal connected to the interface is received;

second determination means for determining whether or not there is an incoming call from an outside line specified by an initial portion of a called party number included in the setup message; and connection means for, if said first determination means determines that the setup message is received and said second determination means determines that there is an incoming call from the outside line, connecting the extension ISDN terminal which has transmitted the setup message with the outside line.

12. The apparatus according to claim 11, wherein said connection means includes:

stop means for stopping an incoming call tone to a terminal called by the incoming call from the outside line;

send-back means for transmitting a response message to the extension ISDN terminal which has transmitted the setup message; and means for connecting the outside line and the extension ISDN terminal which has transmitted the setup message.

13. A telephone exchange apparatus having an extension ISDN interface, comprising:

reception means for receiving a setup message including a called party number from an extension ISDN terminal connected to the interface;

first determination means for determining whether or not there is an incoming call from an extension;

second determination means for determining whether or not an initial portion of the called party number has a predetermined value for responding to the incoming call; and connection means for, if said first determination means determines that there is an incoming call from the extension and said second determination means determines that the initial portion of the called party number has the predetermined value for responding to the incoming call, connecting the extension ISDN terminal which has transmitted the setup message with the calling extension.

14. The apparatus according to claim 13, wherein said connection means includes:

send-back means for transmitting a response message to the extension ISDN terminal which has transmitted the setup message;

stop means for stopping the incoming-call tone to an extension terminal called by the extension incoming call; and means for connecting a communication path between the called side extension terminal and the extension ISDN terminal to which said send-back means transmitted the response message.

15. A telephone exchange apparatus having an extension ISDN interface, comprising:

determination means for determining whether or not a predetermined setup message including a called party number from an extension ISDN terminal connected to the interface is received; and seizing means for, if said determination means determines that the setup message is received, seizing an outside line connected to an outside network based on the called party number included in the setup message, the outside network being outside of the telephone exchange apparatus.

16. A telephone exchange apparatus having an extension ISDN interface, comprising:

determination means for determining whether or not a setup message in a predetermined format including a called party number from an extension ISDN terminal connected to the interface is received;

selection means for, if said determination means determines that the setup message is received, selecting an outside line connected to an outside network based on the called party number included in the setup message, the outside network being outside of the telephone exchange apparatus; and calling means for calling based on a dialing information from the extension ISDN terminal via the outside line selected by said selection means.

17. A telephone exchange apparatus having an outside line interface for at least one outside line and extension interface for a plurality of extension telephones, including at least one ISDN extension telephone, comprising:

memory means for storing status information of the at least one outside line and the plurality of extension telephones; reception means for receiving a setup message including a called party number from an extension ISDN telephone;

first determination means for determining based on the contents of said memory means whether or not there is a held call;

second determination means for determining whether or not an initial portion of the called party number has a predetermined value for responding to the held call; and connection means for, if said first determination means determines that there is a held call and said second determination means determines that the initial portion of the called party identification has the predetermined value for responding to the held call, connecting the call with the extension ISDN terminal which has transmitted the setup message.

18. The apparatus according to claim 17, wherein the held call is held outside line.

19. The apparatus according to claim 17, wherein the held call is held extension telephone.

20. A telephone exchange apparatus having an interface for at least one outside line and an interface for a plurality of extension telephones, including at least one ISDN telephone, comprising:

reception means for receiving whether or not a setup message including a called party number from an extension ISDN telephone;

first determination means for determining whether or not an initial portion of the called party number has a predetermined value for responding to an incoming call;

second determination means for determining whether or not there is a called extension; and connection means for, if said second determination means determines that there is a called extension and said first determination means determines that the initial portion of the called party number has the predetermined value for responding to an incoming call, connecting a calling side and the extension ISDN terminal which has transmitted the setup message.

21. The apparatus according to claim 20, wherein the calling side is connected to an outside line.

22. The apparatus according to claim 20, wherein the calling side is an extension telephone.

23. A telephone exchange apparatus having an interface for connection to a plurality of different kinds of outside lines which are outside of the telephone exchange apparatus and an interface for connection to a plurality of extensions including at least one extension ISDN telephone, comprising:

memory means for storing status information of outside lines and extensions connected to the interfaces;

reception means for receiving a setup message in a predetermined format including a called party number from an extension ISDN telephone;

detection means for detecting the status of a specified outside line specified by the called party number based on the status information stored by said memory means;

calling means for, if said detection means detects that the status of the specified outside line is non-busy, connecting the extension ISDN terminal which has transmitted the setup message with the specified outside line, thereby making an outside line call; and connection means for, if said detection means detects that the status of the specified outside line has a held status or a called status, setting the status of the outside line to busy status and connecting the extension ISDN telephone which has transmitted the setup message with the outside line.

24. A connecting method for a communication network, comprising the steps of:

detecting a message used for making an outgoing call to a digital public network, transmitted by a terminal;

determining whether or not an initial portion of a called party number included in the message has a predetermined value for responding to a held call; and connecting the terminal with the held call, based on a determination in said determining step.

25. The connecting method according to claim 24, wherein one of a plurality of external lines in a held state is selected by a called party number included in the message.

26. The connecting method according to claim 24, wherein a SETUP message is detected in said detecting step.

27. The connecting method according to claim 24, wherein the message for making the outgoing call to an ISDN is detected in said detecting step.

28. The connecting method according to claim 24, wherein the terminal is connected with one of a plurality of external lines in said connecting step.

29. A connecting method for a communication network, comprising the steps of:

detecting a message used for making an outgoing call to a digital public network, transmitted by a terminal;

determining whether or not an initial portion of a called party number included in the message has a predetermined value for responding to an incoming call; and connecting the terminal with the incoming call, based on a determination in said determining step.

30. The connecting method according to claim 29, wherein one of a plurality of external lines in an incoming state is selected by a called party number included in the message.

31. The connecting method according to claim 29, wherein a SETUP message is detected in said detecting step.

32. The connecting method according to claim 29, wherein the message for making the outgoing call to an ISDN is detected in said detecting step.

33. The connecting method according to claim 29, wherein the terminal is connected with one of a plurality of external lines in said connecting step.

34. A connecting method for a communication network, comprising the steps of:

detecting a message including a called party number of plural digits, used for making an outgoing call to a digital network, transmitted by a terminal;

determining whether or not the called party number has a predetermined value for responding to a held call; and connecting the terminal with a held call, based on a determination in said determining step.

35. The connecting method according to claim 34, wherein one of a plurality of external lines in a held state is selected by the called party number included in the message.

36. The connecting method according to claim 34, wherein a SETUP message is detected in said detecting step.

37. The connecting method according to claim 34, wherein the message for making the outgoing call to an ISDN is detected in said detecting step.

38. The connecting method according to claim 34, wherein the terminal is connected with one of a plurality of external lines in said connecting step.

39. A connecting method for a communication network, comprising the steps of:
   detecting a message including a called party number of plural digits, used for making an outgoing call to a digital network, transmitted by a terminal;
   determining whether or not the called party number has a predetermined value for responding to an incoming call; and
   connecting the terminal with an incoming call, based on a determination in said determining step.

40. The connecting method according to claim 39, wherein one of a plurality of external lines in an incoming state is selected by the called party number included in this message.

41. The connecting method according to claim 39, wherein a SETUP message is detected in said detecting step.

42. The connecting method according to claim 39, wherein the message for making the outgoing call to an ISDN is detected in said detecting step.

43. The connecting method according to claim 39, wherein the terminal is connected with one of a plurality of external lines in said connecting step.

44. A communication apparatus, comprising:
   means for detecting a message used for making an outgoing call to a digital public network, transmitted by a terminal;
   means for determining whether or not an initial portion of a called party number included in the message has a predetermined value for responding to a held call; and
   means for connecting the terminal with the held call, based on a determination by said means for determining.

45. The apparatus according to claim 44, wherein one of a plurality of external lines in a held state is selected by a called party number included in the message.

46. The apparatus according to claim 44, wherein the message used for making an outgoing call is a SETUP message.

47. The apparatus according to claim 44, wherein the digital public network is an ISDN.

48. The apparatus according to claim 44, wherein the means for connecting is operative to connect the terminal with one of a plurality of lines external to the communication apparatus.

49. A communication apparatus, comprising:
   means for detecting a message used for making an outgoing call to a digital public network, transmitted by a terminal;
   means for determining whether or not an initial portion of a called party number included in the message has a predetermined value for responding to an incoming call; and
   means for connecting the terminal with the incoming call, based on a determination by said means for determining.

50. The apparatus according to claim 49, wherein one of a plurality of external lines in an incoming state is selected by a called party number included in the message.

51. The apparatus according to claim 49, wherein the message is a SETUP message.

52. The apparatus according to claim 49, wherein the digital public network is an ISDN.

53. The apparatus according to claim 49, wherein the means for connecting is operative to connect the terminal with one of a plurality of lines external to the communication apparatus.

54. An article of manufacture comprising:
   a memory for storing states of lines connected to a communication apparatus, one of the lines having a held state in the memory indicating a held call on the one line;
   wherein the communication apparatus includes:
      means for detecting a message used for making an outgoing call to a digital public network, transmitted by a terminal;
      means for determining whether or not an initial portion of a called party number included in the message has a predetermined value for responding to the held call; and
      means for connecting the terminal with the one line having the held call, based on a determination by said means for determining.

55. The article of manufacture according to claim 54, wherein one of a plurality of external lines in a held state is selected by a called party number included in the message.

56. The article of manufacture according to claim 54, wherein a SETUP message is detected by said means for detecting.

57. The article of manufacture according to claim 54, wherein the message for making the outgoing call to an ISDN is detected by said means for detecting.

58. The article of manufacture according to claim 54, wherein said means for connecting is operative to connect the terminal with one of a plurality of external lines.

59. An article of manufacture comprising:
   a memory for storing states of lines connected to a communication apparatus, one of the lines having an incoming call state in the memory indicating an incoming call on the one line,
   wherein the communication apparatus includes:
      means for detecting a message used for making an outgoing call to a digital public network, transmitted by a terminal;
      means for determining whether or not an initial portion of a called party number included in the message has a predetermined value for responding to the incoming call; and
      means for connecting the terminal with the one line having the incoming call, based on a determination by said means for determining.

60. The article of manufacture according to claim 59, wherein one of a plurality of external lines in an incoming state is selected by a called party number included in the message.

61. The article of manufacture according to claim 59, wherein a SETUP message is detected by said means for detecting.

62. The article of manufacture according to claim 59, wherein the message for making the outgoing call to an ISDN is detected by said means for detecting.

63. The article of manufacture according to claim 59, wherein said means for connecting is operative to connect the terminal with one of a plurality of external lines.

* * * * *

UNITED STATES PATENT AND TRADEMARK OFFICE
CERTIFICATE OF CORRECTION

PATENT NO. : 5,999,608
DATED : December 7, 1999
INVENTOR(S) : Yoshihiro Tanigawa It is certified that error appears in the above-identified patent and that said Letters Patent is hereby corrected as shown below:

ON THE TITLE PAGE

Under [56] "References Cited" insert:

-- FOREIGN PATENT DOCUMENTS

| | | |
|---|---|---|
| 3-173251 | 07/26/1991 | Japan |
| 51-21411 | 02/20/1976 | Japan |
| 51-38909 | 03/31/1976 | Japan |

OTHER PUBLICATIONS

Abstract, JPA 2-89447, March 29, 1990

IN THE CLAIMS

Claim 12, Column 12, line 11, after "and" delete "the".
Claim 14, Column 12, line 43, delete "called" and insert therefor -- calling --.

Signed and Sealed this

Fifteenth Day of May, 2001

*Attest:*

NICHOLAS P. GODICI

*Attesting Officer*   *Acting Director of the United States Patent and Trademark Office*